United States Patent Office 3,655,836
Patented Apr. 11, 1972

3,655,836
PROCESS FOR PREPARATION OF MOLDED PROPELLANT CHARGES FROM SMOKELESS POWDER AND NONVOLATILE BINDERS
Henry C. Dehm, Salt Lake City, Utah, and Dale F. Mellow, Sugar Grove, Va., assignors to Hercules Incorporated, Wilmington, Del.
No Drawing. Filed June 26, 1968, Ser. No. 740,074
Int. Cl. C06b 21/02
U.S. Cl. 264—3
14 Claims

ABSTRACT OF THE DISCLOSURE

A method for preparing propellant charges from smokeless powder and nonvolatile binders boiling above about 200° C. is provided. The smokeless powder granules and nonvolatile binders are consolidated into the propellant charge by molding. The consolidated propellant charge is dimensionally stable and burns as a granular charge.

This invention relates to a method of preparation of propellant charges from smokeless powder and nonvolatile binders by a molding technique. More particularly this invention relates to a method of preparation of caseless cartridges from smokeless powder and nonvolatile binders.

Caseless cartridges have been prepared heretofore principally by bonding smokeless powder granules together employing as a binder for the smokeless powder granules, a dilute solution of nitrocellulose in a volatile solvent mixture. The primary difficulty with this process is solvent removal. The resulting molded propellant charge is often dimensionally unstable due to incomplete removal of the solvent. The use of the volatile solvent also presents a fire hazard. This process is costly because of the necessity of machining the final grain due to dimensional stability problems, and the difficulty of cleaning of mold parts which become coated with nitrocellulose lacquer.

It is an object of this invention to provide a method for preparing a propellant charge useful as a caseless cartridge. The propellant charge is prepared from smokeless powder granules and a nonvolatile binder which eliminates the previously designated problems resulting from use of volatile solvent in the binder system.

It is another object of this invention to provide a method of manufacturing caseless cartridges which have substantially equivalent ballistics to conventional cartridges.

Other objects of this invention will, in part, appear hereinafter. For a complete understanding of the nature and objects of this invention, reference is made to the following detailed description.

Broadly, in accordance with this invention there is provided a process for preparation of a propellant charge which comprises admixing smokeless powder granules and a nonvolatile binder, and subjecting the admixture to pressure whereby the granules are consolidated to produce a strong propellant charge wherein the smokeless powder granules retain their individual identity.

The nonvolatile binders of this invention are natural and synthetic resins, and polymers and prepolymers having a boiling point above about 200° C. These binders can be in the solid or liquid state at ambient temperature and must be compatible with nitrocellulose. The nonvolatile binders of this invention burn completely during combustion of the propellant charge in which they are employed.

Very satisfactory mixing of smokeless powder granules and nonvolatile binders can be achieved by tumbling the powder and binder which can be in either the solid or liquid state. In general, from about 1% to about 5% by weight of nonvolatile binder is admixed with the smokeless powder granules, based on the weight of the admixture. Mixing times vary from about one minute to about one hour, longer times being required where higher percentages of nonvolatile binder are employed. Solid nonvolatile binders are preferably employed in the form of small particles. Solid nonvolatile binders can also be employed by first heating the binder until it flows, and then admixing the flowable binder with pre-heated smokeless powder.

Following the mixing of the smokeless powder granules and the nonvolatile binder, the resulting admixture is charged to a mold. The mold is preconditioned to a temperature of from about 20° C. to about 100° C. The higher preconditioning temperatures are employed when the nonvolatile binder is softened only at elevated temperatures. Although mold temperatures above 100° C. can be hazardous, polymeric binders that flow at temperatures considerably above 100° C. can be employed if the residence time at the elevated temperature does not exceed the time-temperature stability limit for nitrocellulose.

The admixure is compression molded into a consolidated propellant charge at pressures ranging from about 400 p.s.i. to about 25,000 p.s.i. at dwell times of from about one second to about 60 seconds. When molding pressures below about 400 p.s.i. and dwell times of less than about one second are employed, the resulting propellant charge is not sufficiently consolidated to withstand normal handling operations. Control of molding conditions is important since it is necessary that the smokeless powder granules in the consolidated propellant charge retain their individual identity. The latter requirement is to ensure that on firing of the propellant charge the charge burns as if it were individual granules of smokeless powder, resulting in ballistics which are both reproducible and predictable.

The nonvolatile binders which can be employed in this invention are reactive and unreactive plasticizers for nitrocellulose and reactive and unreactive nonplasticizers for nitrocellulose. Mixtures of two or more of the above classes of nonvolatile binders can be employed if desired. Both the reactive plasticizers and reactive nonplasticizers for nitrocellulose polymerize during the molding steps of the method of this invention.

Examples of suitable nonvolatile binders which are unreactive plasticizers for nitrocellulose which can be employed include nitroglycerin, butane triol trinitrate, diethylene glycol dinitrate, methylene dinitramine, n-methylethylnitramine, nitrate esters of pentaerythritol, and the like. These unreactive plasticizers are highly energetic and can be admixed with one or more miscible, unreactive, relatively low energy plasticizers in order to adjust burning rate and/or mechanical properties. Examples of suitable low-energy plasticizers include triacetin, dibutyl phthalate, dimethyl sebacate, tricresyl phosphate, dibutyl succinate, dibutyl adipate, camphor, ethyl centralite and the like. The unreactive low-energy plasticizers can be employed separately omitting the unreactive energetic plasticizer if desired. Mixtures of two or more unreactive low-energy plasticizers can be employed.

Examples of suitable nonvolatile binders which are reactive plasticizers for nitrocellulose include the acrylates and methacrylates of pentaerythritol mononitrate, dinitrate, and trinitrate, and glycerol triacrylate. The acrylates of the above pentaerythritol nitrates are generally preferred over the methacrylates of these mixtures because they are more reactive, which results in a fast curing rate. Pentaerythritol mononitrate triacrylate and glycerol triacrylate are preferred reactive plasticizers. The reactive plasticizers polymerize during the molding step of this process. Depending on polymerization catalyst, catalyst concentration, mold temperature, and residence time, some post curing of the propellant charge may be required. In every instance however, the propellant charge following the molding operation is dimensionally stable and can be removed from the mold for post cure immediately following the molding operation.

Examples of suitable nonvolatile binders which are unreacted nonplasticizers for nitrocellulose which can be employed are energetic thermoplastics, such as polynitrostyrenes, polyvinyl nitrate, and the polymers derived from the acrylate and methacrylate of pentaerythritol trinitrate, and the like. Mixtures of two or more of these energetic thermoplastics can be employed if desired.

Examples of suitable non-volatile binders which are reactive nonplasticizers for nitrocellulose are $\beta$-stage thermosetting resins which polymerize by a condensation polymerization reaction such as phenol-formaldehyde resins, phenol furfural resins, urea formaldehyde resins, melamine formaldehyde resins, and the like. Mixtures of two or more $\beta$-stage thermosetting resins can be employed if desired.

Examples of still other nonvolatile binders which are reactive non-plasticizers which cross-link with the nitrocellulose contained in the smokeless powder during the molding operation are isocyanates having a functionality of two or more. Representative of such isocyanates are tolylene diisocyanate; the diisocyanate derived from the reaction of long chain diols and diisocyanates such as tolylene diisocyanate; and isocyanate mixtures comprised of polymethylene polyphenyl isocyanates having as many as eight isocyanates groups per molecule available commercially under the trade name PAPI.

When employing an isocyanate as the nonvolatile binder for smokeless powder, it is necessary to determine if the isocyanate is a plasticizer for nitrocellulose. If the isocyanate is not a plasticizer for nitrocellulose, then an additional nonvolatile binder which is a plasticizer for nitrocellulose must be employed with the isocyanate. A particularly suitable plasticizer for this purpose is triacetin In general, if a plasticizer is needed with the isocyanate, the weight ratio of plasticizer to isocyanate can vary from about 1:3 to about 3:1.

The following examples will further illustrate the process and binders of this invention. All parts and percentages are by weight unless otherwise specified.

EXAMPLE 1

About 1.50 parts of smokeless powder granules comprised of 84.15% nitrocellulose, 15.0% nitroglycerin, and 0.85% potassium nitrate and 0.06 parts of triacetin (unreactive plasticizer nonvolatile binder) are admixed. A 5.56 mm. mold preheated to 70° C. is filled with the resulting admixture. The admixture is subjected to a pressure of 7000 p.s.i. for sixty seconds. The resulting consolidated caseless cartridge weighs 2 grams, is dimensionally stable after molding, and fits the 5.56 mm. test weapon without need of machining.

The caseless cartridge is fitted with a standard primer and booster for a 5.56 mm. round. A semi-pointed 55 gram soft-point bullet is secured to the cartridge. Ten rounds identical to that described are prepared and fired. Results of the firing of these ten rounds are as follows:

|  | Muzzle velocity, feet/second [1] | Maximum chamber pressure, [2] p.s.i. |
|---|---|---|
| Round: | | |
| 1 | 3,300 |  |
| 2 | 2,994 | 55,000 |
| 3 | 3,257 | 69,000 |
| 4 | 2,825 | 50,000 |
| 5 | 3,289 | 72,000 |
| 6 | 3,165 | 67,000 |
| 7 | 3,195 | 65,000 |
| 8 | 3,135 | 65,000 |
| 9 | 2,907 | 55,000 |
| 10 | 3,021 | 57,000 |

[1] 15 feet from the muzzle.
[2] Piezoelectric pressure transducer.

The muzzle velocity for the bullets fired with the caseless cartridges of this invention is substantially the same as the muzzle velocity of 3114 feet/second obtained with like bullets fired with conventional 5.56 mm. cartridges containing 27.5 grams of smokeless powder of similar composition.

The following example illustrates molding of smokeless powder wetted with a nonvolatile binder which is a mixture of unreactive plasticizer and reactive nonplasticizer.

EXAMPLE 2

About 96 parts of smokeless powder granules comprising 84.15% nitrocellulose, 15.0% nitroglycerin, and 0.85% potassium nitrate are admixed with a nonvolatile binder mixture which is comprised of 3 parts of triacetin (unreactive plasticizer), 1 part of a mixture of polymethylene polyphenyl isocyanates (reactive non-plasticizer), and 0.002 part of dibutyl tin diacetate catalyst. After about one minute of mixing, the smokeless powder granules are uniformly wetted with the nonvolatile binder mixture. The binder-wet smokeless powder granules are charged to an assembled 5.56 mm. mold, preconditioned at 20° C. The charge is pressed at 10,000 p.s.i. for 60 seconds. The polymethylene polyphenyl isocyanates cross-link the nitrocellulose during molding. A dimensionally stable consolidated propellant charge is removed from the mold having a weight of 25.1 grams. This propellant charge is post cured at 120° F. for 48 hours to complete cross-linking. The resulting caseless cartridge fits the 5.56 mm. test weapon without machining and has excellent mechanical properties. Four additional caseless cartridges are prepared as described. The five caseless cartridges are assembled with a primer, a booster, a 55 gram bullet and are fired. Results of the firings are as follows:

|  | Muzzle velocity, feet/second [1] | Maximum chamber pressure, [2] p.s.i. |
|---|---|---|
| Round: | | |
| 1 | 2,611 | 40,000 |
| 2 | 2,326 | 32,000 |
| 3 | 2,481 | 37,000 |
| 4 | 2,551 | 38,000 |
| 5 | 2,564 | 39,000 |

[1] 15 feet from muzzle.
[2] Piezoelectric pressure transducer.

The above ballistic data indicate good break-up of the caseless cartridge into individual granules of smokeless powder since ballistic results are similar to that of conventional ammunition. No residue is left after firing of each round indicating complete burning of the caseless cartridge.

The following example illustrates use of a reactive plasticizer for nitrocellulose as the non-volatile binder.

EXAMPLE 3

About 96 parts of smokeless powder granules comprised of 84.15% nitrocellulose, 15.0% nitroglycerin, and 0.85% potassium nitrate are admixed with a non-volatile binder which is comprised of 4 parts glycerol triacrylate (reactive plasticizer) containing 1% benzoyl peroxide catalyst. After one minute of mixing the smokeless powder granules are uniformly wetted with plasticizer. The mixture is charged to a 5.56 mm. mold which is preheated to 70° C. and molded at a pressure of 14,000 p.s.i. for 10 seconds. The resulting propellant charge is dimensionally stable and is removed from the mold and post cured at 60° C. for four hours. The cured propellant charge does not require machining. The propellant charge is assembled with a primer and bullet and the resulting caseless round is fired. Ballistic results are substantially equivalent to those of conventional ammunition.

The following example illustrates preparation of a caseless cartridge from smokeless powder and a thermoplastic binder which is an unreactive non-plasticizer for nitrocellulose.

EXAMPLE 4

About 96 parts of smokeless powder granules comprised of 84.15% nitrocellulose, 15.0% nitroglycerin, and 0.85% potassium nitrate are admixed with a non-volatile binder comprised of 4 parts of m-nitrostyrene polymer (unreactive non-plasticizer) having an average particle size of about 10μ. The admixture is tumbled in a sweetie barrel mixer to obtain a uniform mixture. The admixture is charged to a 5.56 mm. mold which is preheated to 160° C. The admixture is molded at a pressure of 20,000 p.s.i. for ten seconds. A propellant charge results which is strong, dimensionally stable, and requires no post cure or machining. The propellant charge is assembled with a primer, and bullet, and is fired. Ballistics substantially equivalent to those of conventional ammunition are achieved.

The term "smokeless powder" as used herein, is meant to include the well-known single base, double base, and triple base colloided nitrocellulose powders, the nitrocellulose being characterized by a nitrogen content of at least about 11.3 weight percent and generally in the range of from about 12–13.5 percent. As is well known the single base powder contains from about 85 to about 99 weight percent colloided nitrocellulose as the chief component. The double base powder contains the same colloided nitrocellulose component but additionally contains nitroglycerin or an equivalent liquid explosive nitric ester. Triple base powders contain nitroguanidine in addition to colloided nitrocellulose and nitroglycerin. Minor amounts of supplemental ingredients can be utilized in these powders, particularly stabilizing agents, gelation agents, oxidizer salts, and the like, all of which are well known in the art.

The propellant charges of this invention while particularly suitable for use as caseless cartridges, can also be used as propellant charges for power activated tools, for gas generators, for providing pulsed power in magnetohydrodynamic applications, and as consumable cartridge cases.

As will be evident to those skilled in the art, various modifications can be made or followed, in light of the foregoing disclosures and discussion, without departing from the spirit or scope of the disclosure or from the scope of the claims.

What we claim and desire to protect by Letters Patent is:

1. A method for preparation of a propellant charge comprising
   (a) admixing smokeless powder granules and a nonvolatile binder having a boiling point above about 200° C., said nonvolatile binder being a material selected from the group consisting of unreactive plasticizers for nitrocellulose; reactive plasticizers for nitrocellulose; isocyanates having a functionality of two or more; unreactive nonplasticizers for nitrocellulose selected from the group consisting of polynitrostyrene, polyvinyl nitrate, polymers derived from the acrylate and methacrylate of pentaerythritol trinitrate; β-stage thermosetting resins selected from the group consisting of phenol-formaldehyde resins, phenol-furfural resins, urea-formaldehyde resins, melamine-formaldehyde resins; mixtures of the foregoing classes of nonvolatile binders; said nonvolatile binder comprising from about 1% to about 5% by weight of the admixture,
   (b) charging the admixture of step (a) to a mold,
   (c) compression molding the admixture at a pressure of from about 400 p.s.i. to about 25,000 p.s.i. for from about one second to about 60 seconds, and
   (d) recovering a consolidated propellant charge in which the smokeless powder granules retain their individual identity.
2. The method of claim 1 in which the nonvolatile binder is comprised of a unreactive plasticizer for nitrocellulose.
3. The method of claim 1 in which the nonvolatile binder is comprised of a reactive plasticizer for nitrocellulose.
4. The method of claim 2 wherein the nonreactive plasticizer is triacetin.
5. The method of claim 2 wherein the nonvolatile binder is a mixture of triacetin and glycerol triacrylate.
6. The method of claim 3 in which the reactive plasticizer is glycerol triacrylate.
7. The method of claim 3 in which the reactive plasticizer is pentaerythritol mononitrate triacrylate.
8. The method of claim 2 in which unreactive plasticizer for nitrocellulose comprises nitroglycerin.
9. The method of claim 8 in which the unreactive plasticizer for nitrocellulose is a mixture of nitroglycerin and triacetin.
10. The method of claim 2 in which the unreactive plasticizer for nitrocellulose comprises diethylene glycol dinitrate.
11. The method of claim 1 in which the nonvolatile binder is an isocyanate having a functionality of at least two.
12. The method of claim 11 in which the isocyanate is a mixture of polymethylene polyphenyl isocyanates.
13. The method of claim 11 in which the isocyanate is tolylene diisocyanate.
14. The method of claim 1 in which the nonvolatile binder is a polynitrostyrene.

References Cited

UNITED STATES PATENTS

| | | | |
|---|---|---|---|
| 3,103,458 | 9/1963 | Besser et al. | 149—98 |
| 3,149,012 | 9/1964 | Preckel | 149—98 |
| 3,378,611 | 4/1968 | Kincaid et al. | 264—3 |

CARL D. QUARFORTH, Primary Examiner

S. J. LECHERT, Jr., Assistant Examiner

U.S. Cl. X.R.

149—63, 64, 65, 88, 93, 96, 97, 98, 99, 100, 105